(12) United States Patent
McFarlane

(10) Patent No.: US 9,950,444 B2
(45) Date of Patent: Apr. 24, 2018

(54) MIXER APPARATUS

(71) Applicant: Brinsley McFarlane, Carmichael (GB)

(72) Inventor: Brinsley McFarlane, Carmichael (GB)

( * ) Notice: Subject to any disclaimer, the term of this patent is extended or adjusted under 35 U.S.C. 154(b) by 0 days.

(21) Appl. No.: 14/894,249

(22) PCT Filed: May 30, 2014

(86) PCT No.: PCT/GB2014/051663
§ 371 (c)(1),
(2) Date: Nov. 25, 2015

(87) PCT Pub. No.: WO2014/191766
PCT Pub. Date: Dec. 4, 2014

(65) Prior Publication Data
US 2016/0114497 A1    Apr. 28, 2016

(30) Foreign Application Priority Data
May 30, 2013    (GB) .................... 1309615.1

(51) Int. Cl.
*B28C 5/42* (2006.01)
*B03B 9/06* (2006.01)
(Continued)

(52) U.S. Cl.
CPC ............ *B28C 5/4248* (2013.01); *B01D 35/02* (2013.01); *B03B 9/063* (2013.01); *B08B 3/04* (2013.01);
(Continued)

(58) Field of Classification Search
CPC .................................................. B28C 5/4248
(Continued)

(56) References Cited

U.S. PATENT DOCUMENTS 340,484 A * 4/1886 Carrico ................. D21D 5/026
209/273
393,295 A * 11/1888 Carrico .................... B07B 1/46
209/273
(Continued)

FOREIGN PATENT DOCUMENTS

| DE | 7801970 U1 | 5/1978 |
| DE | 8024434 | 9/1988 |
| FR | 2321333 | 3/1977 |

OTHER PUBLICATIONS

International Search Report corresponding to International Pat. Appl. No. PCT/GB2014/051663, dated Nov. 9, 2014, 4 pages.
(Continued)

*Primary Examiner* — Abbas Rashid
(74) *Attorney, Agent, or Firm* — Tarolli, Sundheim, Covell & Tummino LLP

(57) ABSTRACT

An apparatus (10) for a lorry-based concrete mixer (12) is described. The apparatus (10) comprises a vessel (14) adapted to be positioned beneath a concrete mixer discharge chute portion (16), the vessel (14) comprising a vessel body (18), the vessel body (18) defining a vessel inlet (20) and a vessel outlet (22), the vessel inlet (20) being adapted to receive debris and fluid exiting the chute discharge portion (16), and the vessel outlet (22) being adapted to permit debris and fluid stored in the vessel body (18) to be discharged from the vessel body (18). There is a direct line of sight (24) for a user (26) through the vessel inlet (20) to the vessel outlet (22).

1 Claim, 8 Drawing Sheets

(51) Int. Cl.
*B08B 17/02* (2006.01)
*B01D 35/02* (2006.01)
*B08B 3/04* (2006.01)

(52) U.S. Cl.
CPC .......... *B08B 17/025* (2013.01); *B28C 5/4203* (2013.01); *Y02W 30/58* (2015.05)

(58) Field of Classification Search
USPC ..................................................... 366/41, 68
See application file for complete search history.

(56) References Cited

U.S. PATENT DOCUMENTS

| | | | | |
|---|---|---|---|---|
| 854,029 A * | 5/1907 | Campbell | ............. | B28C 5/4237 366/41 |
| 880,248 A * | 2/1908 | Smith | ................... | B28C 5/4248 193/10 |
| 883,498 A * | 3/1908 | Smith | ................... | B28C 5/4248 193/10 |
| 892,518 A * | 7/1908 | Hinchman | ............ | B28C 5/4248 366/68 |
| 892,519 A * | 7/1908 | Hinchman | ............ | B28C 5/2081 193/10 |
| 2,280,513 A * | 4/1942 | Jaeger | ................... | B28C 5/4262 366/40 |
| 2,859,949 A * | 11/1958 | Jack | ...................... | B28C 5/4248 193/16 |
| 4,572,782 A * | 2/1986 | Smith | ...................... | B07B 1/46 193/3 |
| 5,685,978 A | 11/1997 | Petrick et al. | | |
| 7,506,672 B2 * | 3/2009 | Manno | ................... | B03B 9/063 134/104.4 |
| 8,113,220 B2 * | 2/2012 | Inglese | .................... | B28B 7/06 134/104.1 |
| 2004/0155126 A1 | 8/2004 | Jenkins | | |
| 2007/0272303 A1 | 11/2007 | Vizl | | |
| 2010/0294730 A1 | 11/2010 | Weston | | |
| 2014/0098625 A1 * | 4/2014 | McFarlane | ............ | B08B 17/025 366/68 |

OTHER PUBLICATIONS

International Preliminary Report and Written Opinion to corresponding international patent application No. PCT/GB2014/051663, dated Dec. 1, 2015, 9 pages.

* cited by examiner

MIXER APPARATUS

CROSS-REFERENCE TO RELATED APPLICATIONS

This application is the U.S. national phase entry of PCT/GB2014/051663, with an international filing date of May 30, 2014, which claims priority to and the benefit of GB 1309615.1, filed on May 30, 2013, the contents of which are hereby incorporated by reference in their entirety.

FIELD OF THE INVENTION

The present invention relates to an apparatus for a lorry-based concrete mixer. Particularly, but not exclusively the apparatus relates to an apparatus for catching debris which may fall from a discharge chute of a lorry-based concrete mixer during transit.

BACKGROUND TO THE INVENTION

Lorry-based concrete mixers are supplied with a movable discharge chute which can be positioned in various configurations to allow the discharge of concrete from the mixer drum.

After discharge of concrete, it is extremely desirable to wash down the chute as quickly as possible to remove concrete residue. If this residue is not removed relatively quickly, it can set on the chute, adhering to the chute surface and creating a build up of concrete.

This build up residue can have a number of negative effects. For example if the residue breaks free of the surface whilst the vehicle is in transit there is a high risk of the residue hitting a vehicle travelling behind the concrete mixer.

Furthermore, the residue build up increases the weight of the truck and particularly the discharge chute, putting undue strain on the chute support structure.

However, it is not always possible to clean the chute immediately after discharge as a growing number of construction companies are restricting or even banning lorry-based concrete mixers from washing down chutes on site to ensure site compliance with environmental regulations such as the Water Resources Act 1991, the Water Industry Act 1991, the Anti Pollution Works Regulations 1999, and the Environmental Permitting Regulations (EPR) 2010.

Additionally there is a problem with stones in the drum bouncing out of the drum and down the chute when the mixer is in transit, posing a similar danger as the residue to other vehicles.

These problems have been alleviated by supplying a lorry based mixer with a method of collecting and storing the chute wash water and loose stones and debris in a tank until such times as the contaminated water can be disposed of correctly. However, it has been found that a layer of sludge can build up in these tanks and the tanks can, subsequently, be difficult to empty.

SUMMARY OF THE INVENTION

According to a first aspect of the present invention there is provided an apparatus for a lorry-based concrete mixer, the apparatus comprising:

a vessel adapted to be positioned beneath a concrete mixer discharge chute portion, the vessel comprising a vessel body, the vessel body defining a vessel inlet and a vessel outlet, the vessel inlet being adapted to receive debris and fluid exiting the chute discharge portion, and the vessel outlet being adapted to permit debris and fluid stored in the vessel body to be discharged from the vessel body;

wherein there is a direct line of sight for a user through the vessel inlet to the vessel outlet.

In at least one embodiment of the present invention, providing a direct line of sight for a user through the vessel inlet to the vessel outlet permits a user to identify and clear blockages more easily.

In one embodiment, the vessel inlet is adapted to receive debris and fluid exiting the chute discharge portion when the discharge chute is in a stowed position.

The vessel may have a longitudinal axis.

The vessel longitudinal axis may, in use, lie perpendicular to a concrete mixer lorry longitudinal axis.

The vessel longitudinal axis may, in use, lie in the same plane as a discharge chute longitudinal axis.

The vessel may extend, in use, across more than 50% of the width of a concrete mixer lorry.

In one embodiment, the vessel inlet and the vessel outlet may be located on opposite sides of the vessel.

Where the vessel inlet and the vessel outlet are located on opposite sides of the vessel, the apparatus line of sight between the vessel inlet and the vessel outlet may be at an acute angle to the horizontal.

In this embodiment, the apparatus line of sight may pass through a vertical plane containing the concrete mixer lorry longitudinal axis.

In an alternative embodiment, the vessel inlet and the vessel outlet may be located on the same side of the vessel.

Where the vessel inlet and the vessel outlet are located on the same side of the vessel, the apparatus line of sight between the vessel inlet and the vessel outlet may be at an obtuse angle to the horizontal.

The vessel inlet may lie in a substantially horizontal plane.

The apparatus may comprise an inlet section.

The inlet section may be attached to the vessel body.

The inlet section may, particularly, be attached to the vessel inlet.

Alternatively, the inlet section may be integral with the vessel body.

The inlet section may define a secondary inlet.

The secondary inlet may have a larger cross sectional area than the vessel inlet.

The inlet section may, in use, taper inwardly from the secondary inlet to the vessel inlet.

The secondary inlet may be adapted to funnel fluid or debris to the vessel inlet.

The apparatus line of sight may permit a user to see through the secondary inlet to the vessel outlet.

The vessel outlet may lie in a substantially vertical plane.

The apparatus may comprise an outlet member.

The outlet member may be releasably attachable to the vessel outlet.

The outlet member may be releasably attachable to the vessel outlet by means of bolts or any suitable fixing.

The outlet member may be adapted to form a seal with the vessel outlet.

The apparatus may further include a seal for forming a seal between the outlet member and the vessel outlet.

The seal may be adapted to be sandwiched between the outlet member and the vessel outlet.

The outlet member may define a secondary outlet.

The secondary outlet may have a smaller cross sectional area than the vessel outlet.

The secondary outlet may have a lowest point, the secondary outlet lowest point being, in use, lower than a vessel outlet lowest point.

The outlet member may define a transition portion between the vessel outlet and the secondary outlet.

The secondary outlet may be closable. The secondary outlet may be closable by means of a cap.

The apparatus line of sight may permit a user to see through the vessel inlet to the secondary outlet.

Particularly, where the apparatus comprises a secondary inlet and a secondary outlet, the apparatus of line sight may permit a user to see through the secondary inlet to the secondary outlet.

The apparatus line of sight may be perpendicular to a plane containing the secondary outlet.

The apparatus may further include a fluid containment device. A fluid containment device may be provided to substantially prevent fluid in the vessel from splashing out whilst, in use, the mixer is in motion.

The fluid containment device may be a baffle.

The fluid containment device may be located adjacent the vessel inlet.

The fluid containment device may be located in the vessel body.

Alternatively or additionally, the fluid containment device may be located in the inlet member.

The fluid containment device may be positioned such that the apparatus line of sight may be maintained.

The fluid containment device may be removably located adjacent the vessel inlet.

Alternatively or additionally, the fluid containment device may be pivotably located adjacent the vessel inlet.

The fluid containment device may be at least partially polymeric.

The apparatus may further include a filter device. The filter device may be provided to prevent large objects entering a portion of the vessel.

The filter device may be a sieve.

The filter device may be located adjacent the vessel inlet.

The filter device may be located in the vessel body.

Alternatively or additionally, the filter device may be located in the inlet member.

The filter device may be removably located adjacent the vessel inlet.

In some embodiments, where the inlet member is removably attached to the vessel body, the filter device may be removable from the vessel inlet with removal of the inlet member.

Where there is both a fluid containment device and a filter device, the filter device may be located above the fluid containment device.

Where there is both a fluid containment device and a filter device, the fluid containment device and the filter device may be unitary.

The filter device may be connected to the fluid containment device.

Filter device and the fluid containment device may be removable as a single unit.

The apparatus may comprise at least one access port.

The at least one access port may be in fluid communication with the vessel body.

The at least one access port may be adapted to receive a water supply. Being able to spray or jet water into the vessel facilitates cleaning of the vessel.

The at least one access port may be mounted to a vessel body wall.

The at least one access port may be pivotably mounted to a vessel body wall. Such an arrangement permits, for example, a water jet to be directed to various locations within the vessel through external manipulation by user.

The at least one access port may alternatively or additionally provide visual inspection of a vessel interior.

The vessel body may comprise a metal.

Alternatively or additionally, the vessel body may comprise a polymer.

The apparatus may further comprise a secondary vessel.

The secondary vessel may be adapted to be located within the vessel.

The secondary vessel may be a liner. A liner be provided to allow any buildup of debris within the apparatus to be removed from the apparatus. This may be of use where concrete is settling at the bottom of the vessel and solidifying due to frequent cleaning.

The liner may be a basket.

The liner may be a plastic tank.

The vessel may further comprise a weir. The weir may be located along the vessel bottom. Such arrangement allows debris to be retained portion of the vessel from which it be easier to remove debris rather than from the full length of the vessel.

The vessel may be at least partially resilient. A resilient vessel can flex allowing, for example, dried debris to be released from the surface of the vessel by hitting the exterior of the vessel with a mallet.

A portion of the vessel may be adapted to move between a first position and a second position, movement between the first and second positions causing debris on the vessel portion surface to be removed. For example the vessel could pop between the first and second positions.

The vessel may include movable material. Movable material such as stones, spiked balls or chain can be used to prevent the build material undisturbed material which in built-up.

The vessel may further include an auger. An auger could be used to move material towards the vessel outlet.

According to a second aspect of the present invention there is provided an apparatus for a lorry-based concrete mixer, the apparatus comprising:

a vessel adapted to be positioned beneath a concrete mixer discharge chute portion, the vessel comprising a vessel body, the vessel body defining a vessel inlet and a vessel outlet, the vessel inlet being adapted to receive debris and fluid exiting the chute discharge portion, and the vessel outlet being adapted to permit debris and fluid stored in the vessel body to be discharged from the vessel body.

It will be understood that non-essential features listed with respect to the first aspect of the present invention may be equally applicable to the subsequent aspects and are not repeated for brevity.

BRIEF DESCRIPTION OF THE DRAWINGS

Embodiments of the present invention will now be described with reference to the accompanying drawings in which.

DETAILED DESCRIPTION OF THE DRAWINGS

Figure 1:
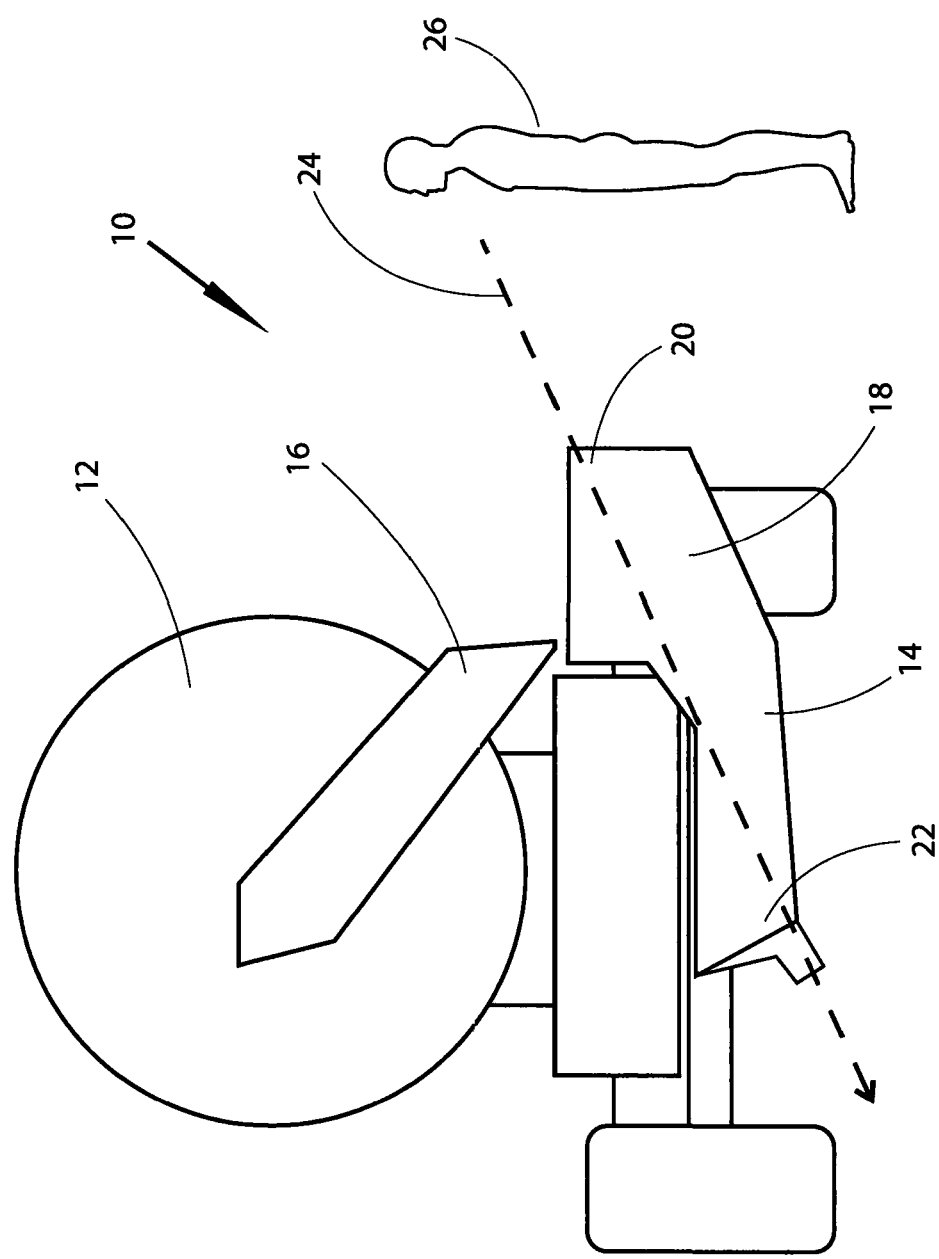
FIG. 1 is a schematic view of an apparatus for a lorry-based concrete mixer according to a first embodiment of the present invention.

Referring firstly to FIG. 1 there is shown a schematic view of an apparatus, generally indicated by reference numeral 10, for a lorry-based concrete mixer 12. The apparatus 10 comprises a vessel 14 adapted to be positioned beneath a concrete mixer discharge chute portion 16. The vessel the vessel 14 comprises a vessel body 18, the vessel body 18 defining vessel inlet 20 and the vessel outlet 22. Vessel inlet 20 is adapted to receive debris and fluid exiting the chute discharge portion 16, and vessel outlet 22 is adapted to permit debris and fluid stored in the vessel body 18 to be discharged from the vessel body 18.

As can be seen from FIG. 1, there is a direct line of sight 24 for a user 26 through the vessel inlet 20 to the vessel outlet 22.

Figure 2:
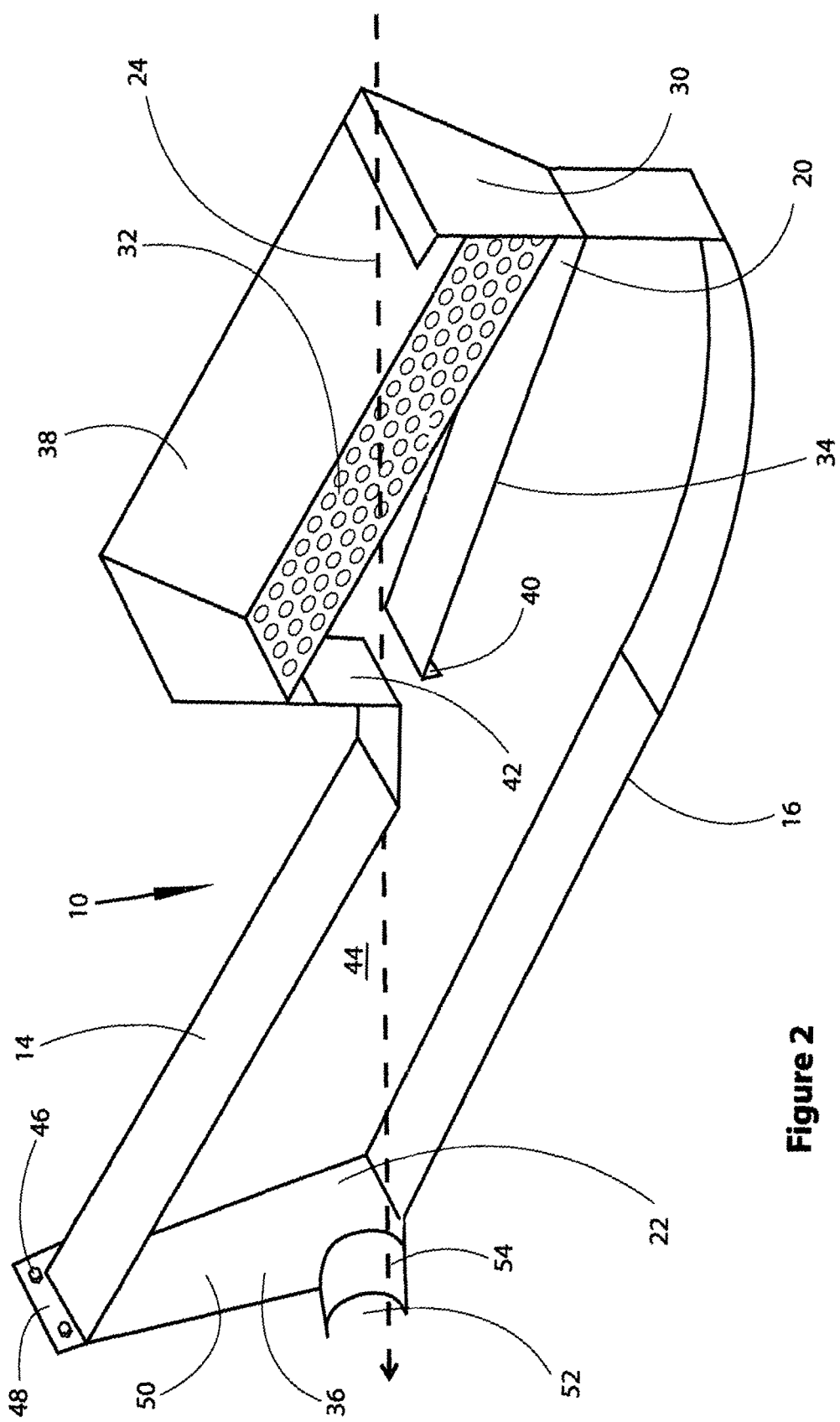
FIG. 2 is a perspective view of a section of the apparatus of FIG. 1.
Figure 3:
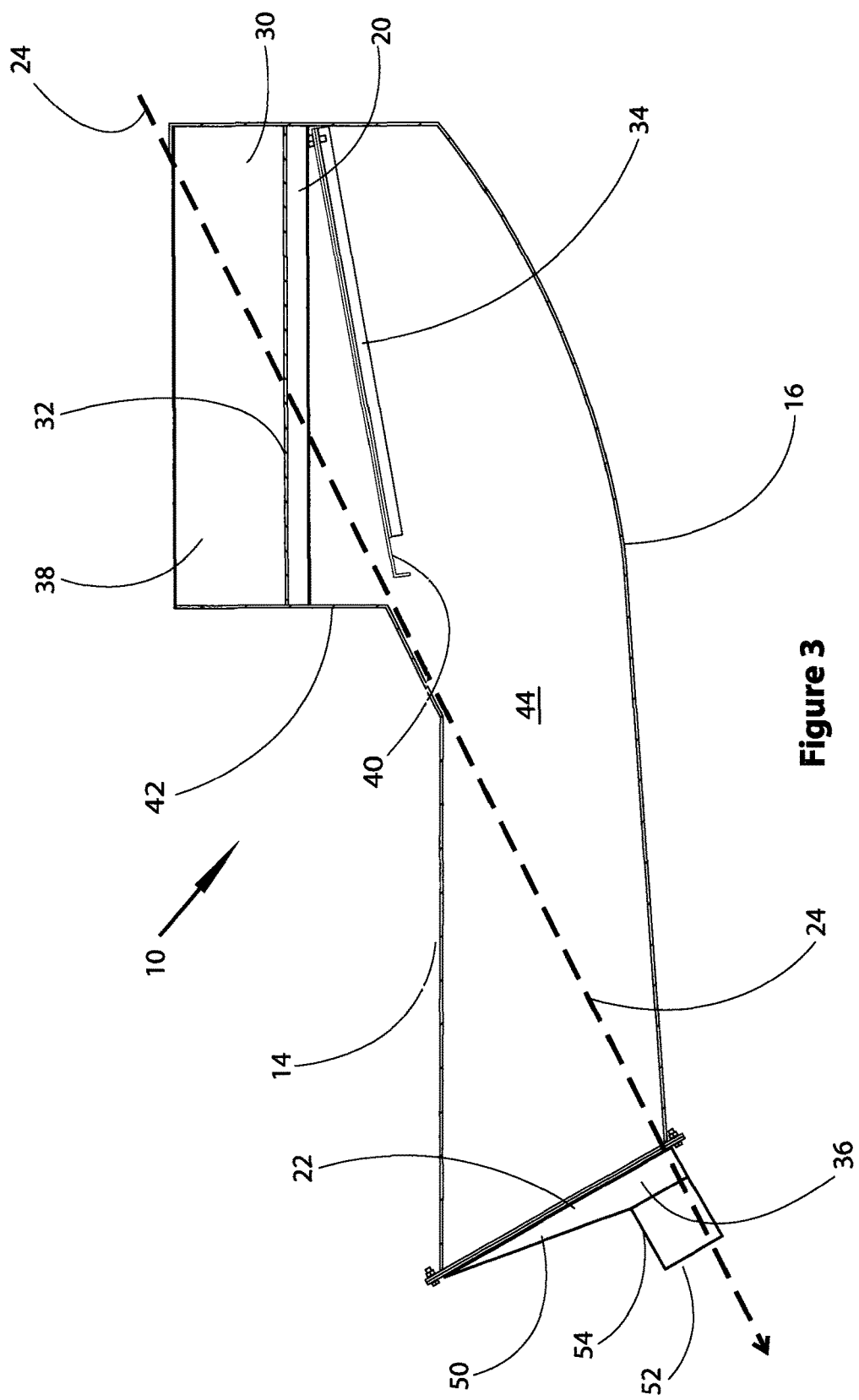
FIG. 3 is a side section of the apparatus of FIG. 1.

Referring now to FIG. 2, a perspective view of a section of the apparatus of FIG. 1 and FIG. 3 is a side section of the apparatus 10 of FIG. 1, further features of the apparatus 10 will now be described.

The apparatus 10 further comprises an inlet section 30, a sieve 32, a baffle 34 and an outlet member 36.

The inlet section 30 is integral with the vessel body 18 and extends above the inlet 20 to a secondary inlet 38. The secondary inlet 38 has a greater cross sectional area than the inlet 20 and the inlet section 30 acts as a funnel to catch fluid and debris exiting the discharge chute portion 16. Particularly, the inlet section 30 is adapted, and is formed, to catch fluid and debris exiting the discharge chute portion 16 when the discharge chute portion 16 is in a stowed configuration, that is in a configuration in which the discharge chute portion 16 is secured for transit.

The baffle 34 is located adjacent and below the vessel inlet 20 and is provided to stop fluid in the vessel 14 from slopping out during transit.

Referring particularly to FIG. 3, the baffle 34 is arranged such that a baffle end 40 is spaced away from the vessel wall 42 such that the line of sight 26 is maintained.

The sieve 32 is located adjacent and above the vessel inlet 20, between the vessel inlet 20 and the secondary inlet 38. The sieve 32 is provided to prevent large pieces of debris from entering the vessel 14 and potentially accumulating to form a blockage and preventing fluid from being able to access the vessel outlet 22.

The sieve 32 and the baffle 34 are removably located adjacent the vessel inlet 20 such that they can be removed to allow access to the vessel interior 44 for cleaning.

Figure 4:
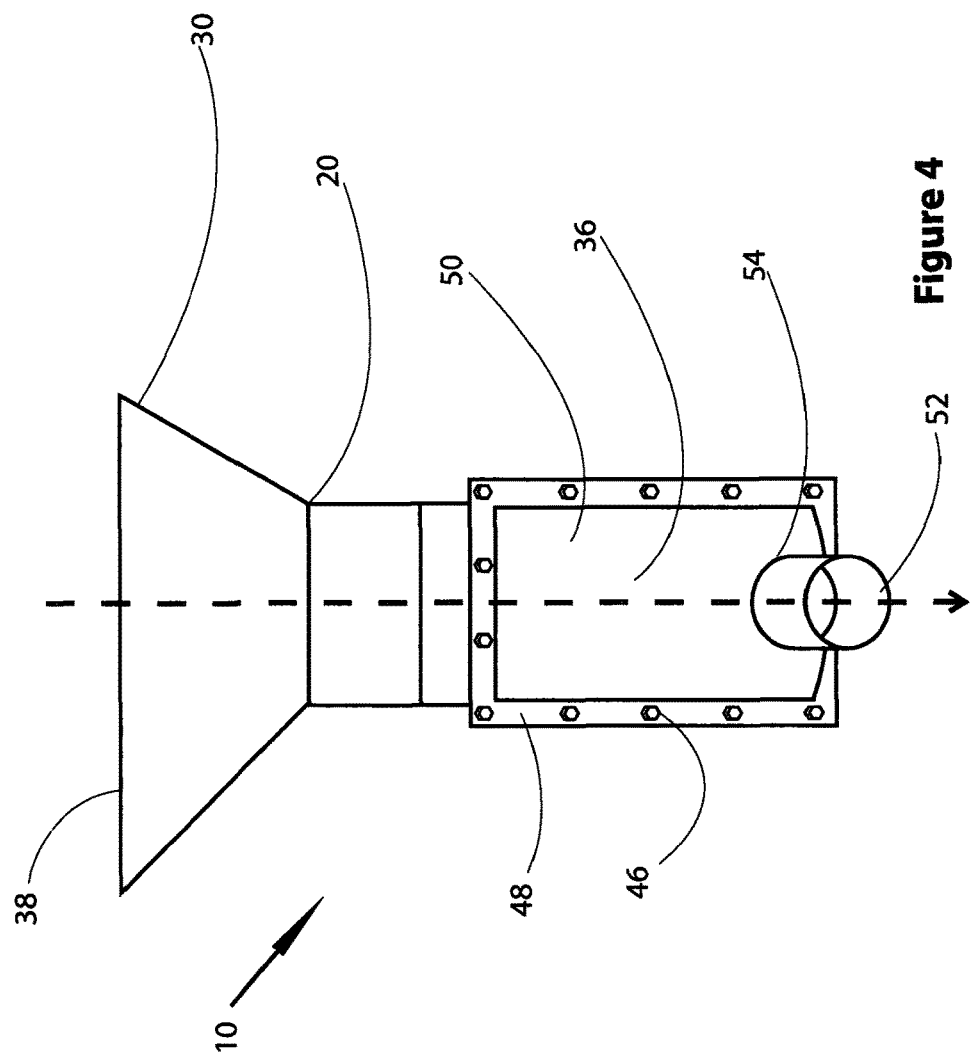
FIG. 4 is an end view of the apparatus of FIG. 1.

Referring to FIG. 3 and to FIG. 4, an end view of the apparatus 10 of FIG. 1, the outlet member 36 is attached to the vessel 14 by means of a series of bolts 46. The bolts 46 attach an outlet member plate 50 to a vessel body flange 48 which extends from the vessel wall 42 away from the vessel outlet 22.

The outlet member 36 further comprises an exit pipe 54 leading to a secondary outlet 52. As can be seen from FIG. 3, the outlet member plate is frustoconical in shape and funnels fluid in the vessel 14 towards the exit pipe 54.

For most training purposes, the exit pipe 54 is adequate to allow the vessel 14 to drain. However, the provision of a removable outlet member 36 allows the entire vessel outlet 22 to be opened by removal of the bolts 46 allowing for greater access to the vessel interior 44 for cleaning if required.

Sandwiched between the outlet member 36 and the vessel flange 48 is a seal gasket (not shown) preventing leakage around the interface between the outlet member 36 and the vessel 14.

During normal use, a cap (not shown) is provided to threadably attach to the exit pipe 54 and cover the secondary exit 52.

Figure 5:
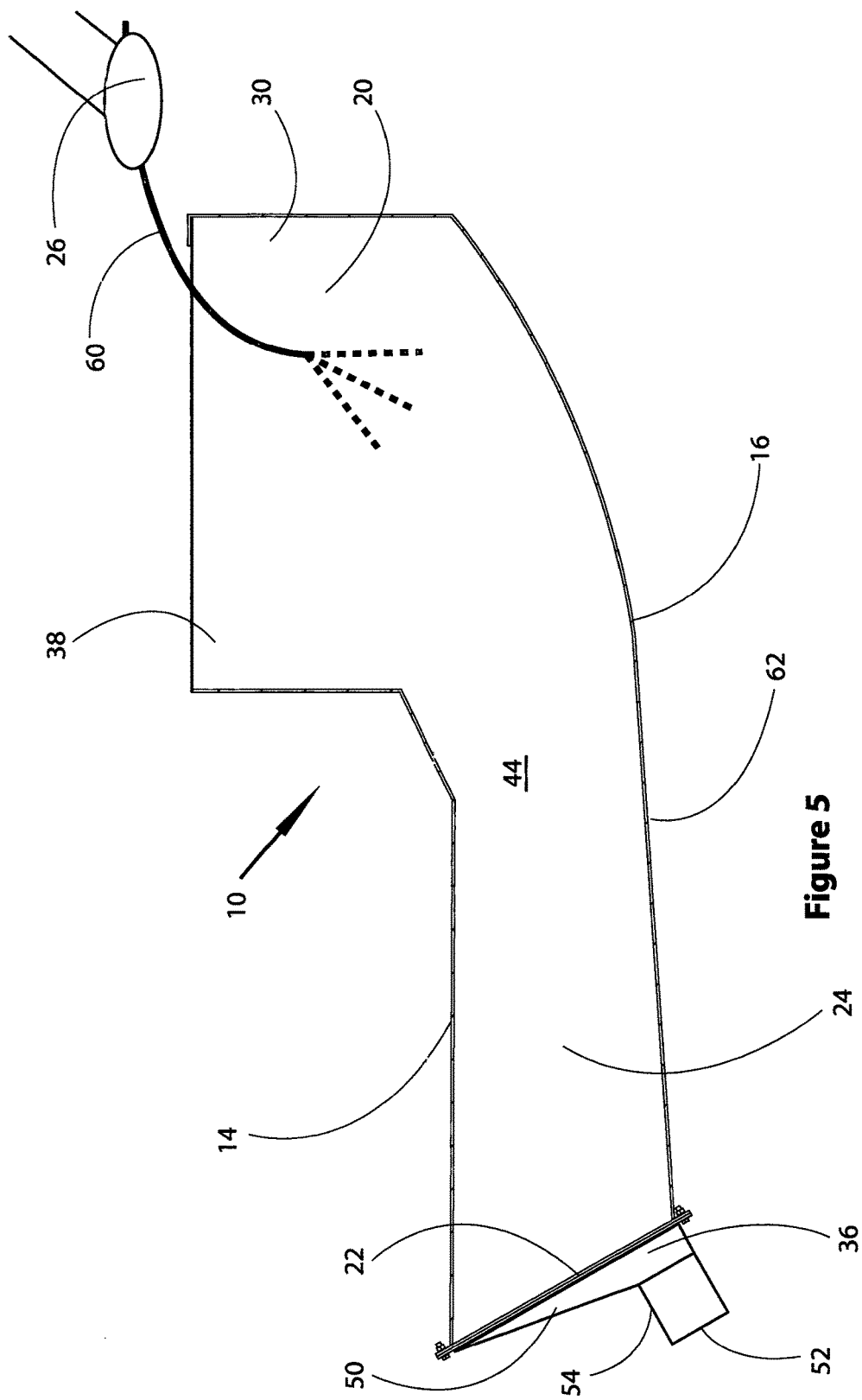
FIG. 5 is a section of the apparatus of FIG. 1 with the baffle and the sieve removed.

Reference is now made to FIG. 5, a section of the apparatus of FIG. 1 with the baffle 34 and the sieve 32 removed. As can be seen from this Figure, with the baffle 34 and the sieve 32 removed, a user 26 can easily hose the vessel interior 44 down using a hose 60. The vessel base 62 is curved to facilitate flow of fluid whether from the discharge chute 16 from a hose 44 towards the vessel outlet 22 and particularly the secondary outlet 52. A scraper (not shown) can be used to push debris towards the secondary exit 52. If the secondary exit 52 is blocked, the outlet member 36 can be removed and debris can then be scraped through the vessel outlet 22.

Figure 6:
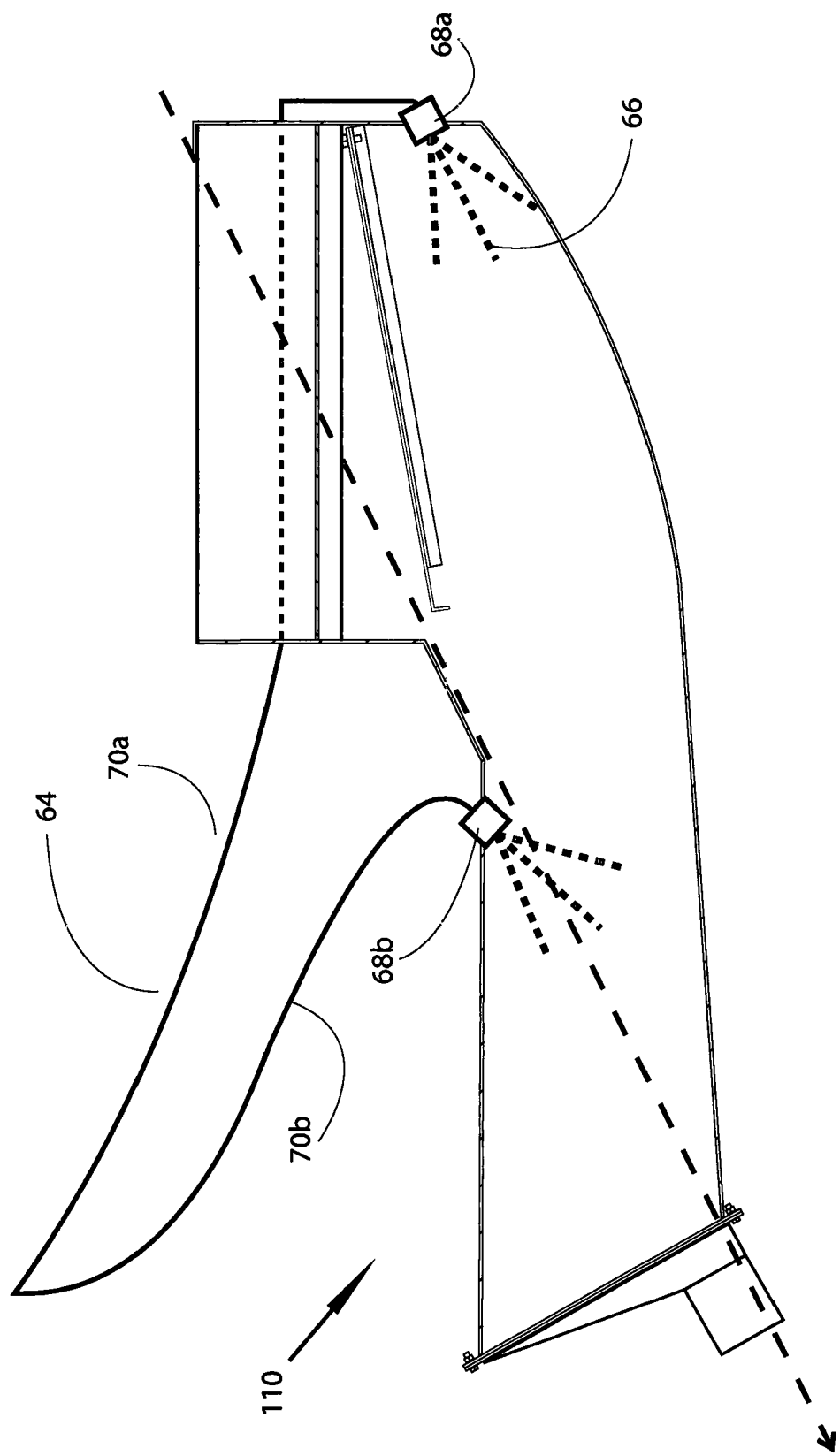
FIG. 6 is a section view of an apparatus for a lorry-based concrete mixer according to a second embodiment of the present invention.

Reference is now made to FIG. 6, a section view of an apparatus 110 according to a second embodiment of the present invention. The features described in this embodiment are similar to those of the first embodiment with the additional provision of a cleaning water supply 64. Water 66 is supplied to nozzles 68a, 68b by hoses 70a, 70b supplied by the concrete mixer truck water system (not shown). Each truck has a water system to allow for cleaning of the truck.

Figure 7:
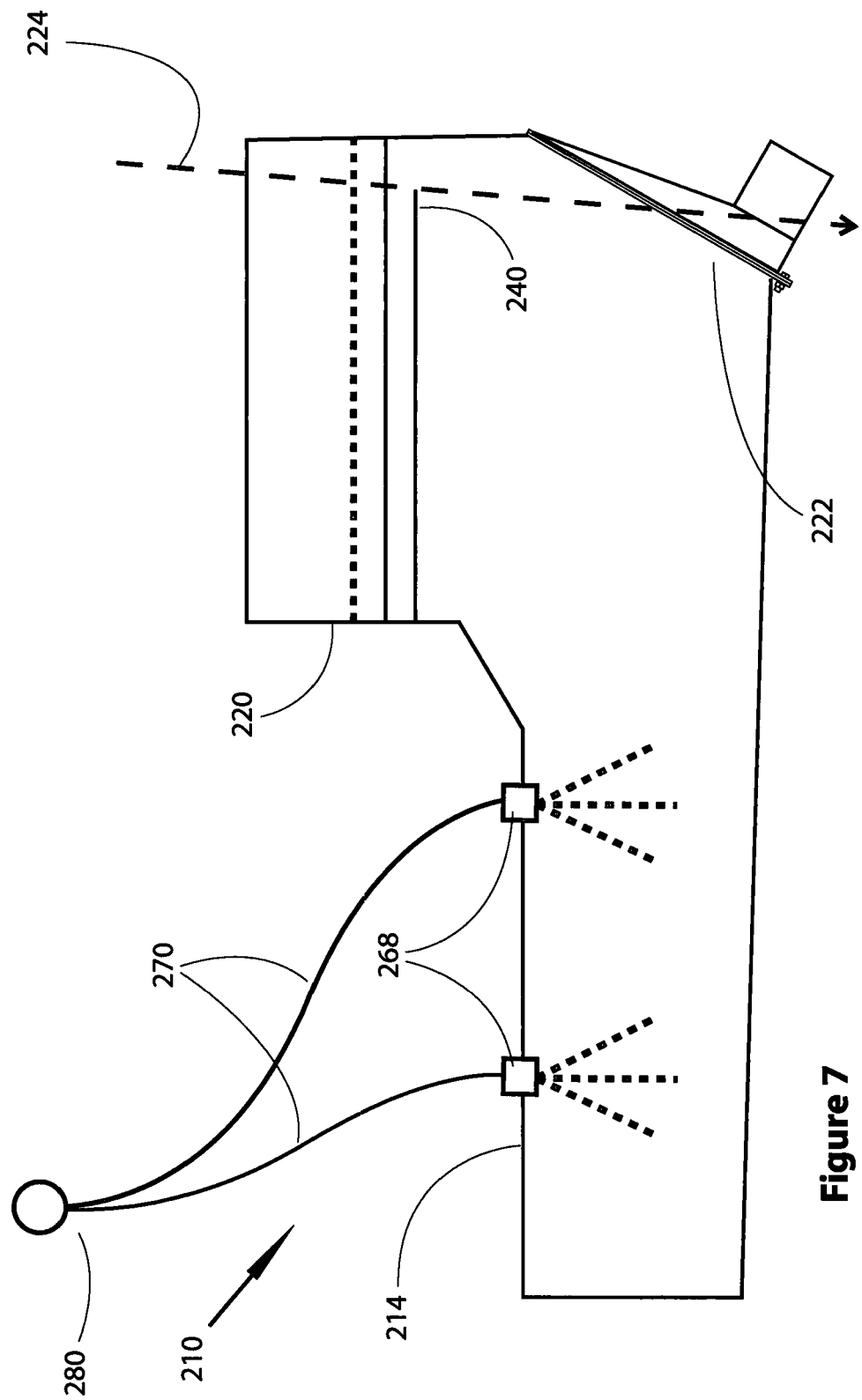
FIG. 7 is a section view of an apparatus for a lorry-based concrete mixer according to a second embodiment of the present invention.

Reference is now made to FIG. 7, a section view of an apparatus 210 according to a second embodiment of the present invention. The primary difference between this embodiment and the embodiments shown in FIG. 1 and FIG. 6 is the location of the vessel outlet 222 which is on the same side of the vessel 214 as the vessel inlet 220.

It will be noted, to accommodate this, the baffle free end 240 is positioned opposite of that shown in FIGS. 1 to 6 such that the line of sight 224 is at an obtuse angle to the horizontal.

In addition, a valve 280 is provided to control the flow of water through the hoses 270 to the nozzles 268. This arrangement permits the inspection, washing and opening of the vessel 214 to be conducted from the same side of the apparatus 210.

Figure 8:
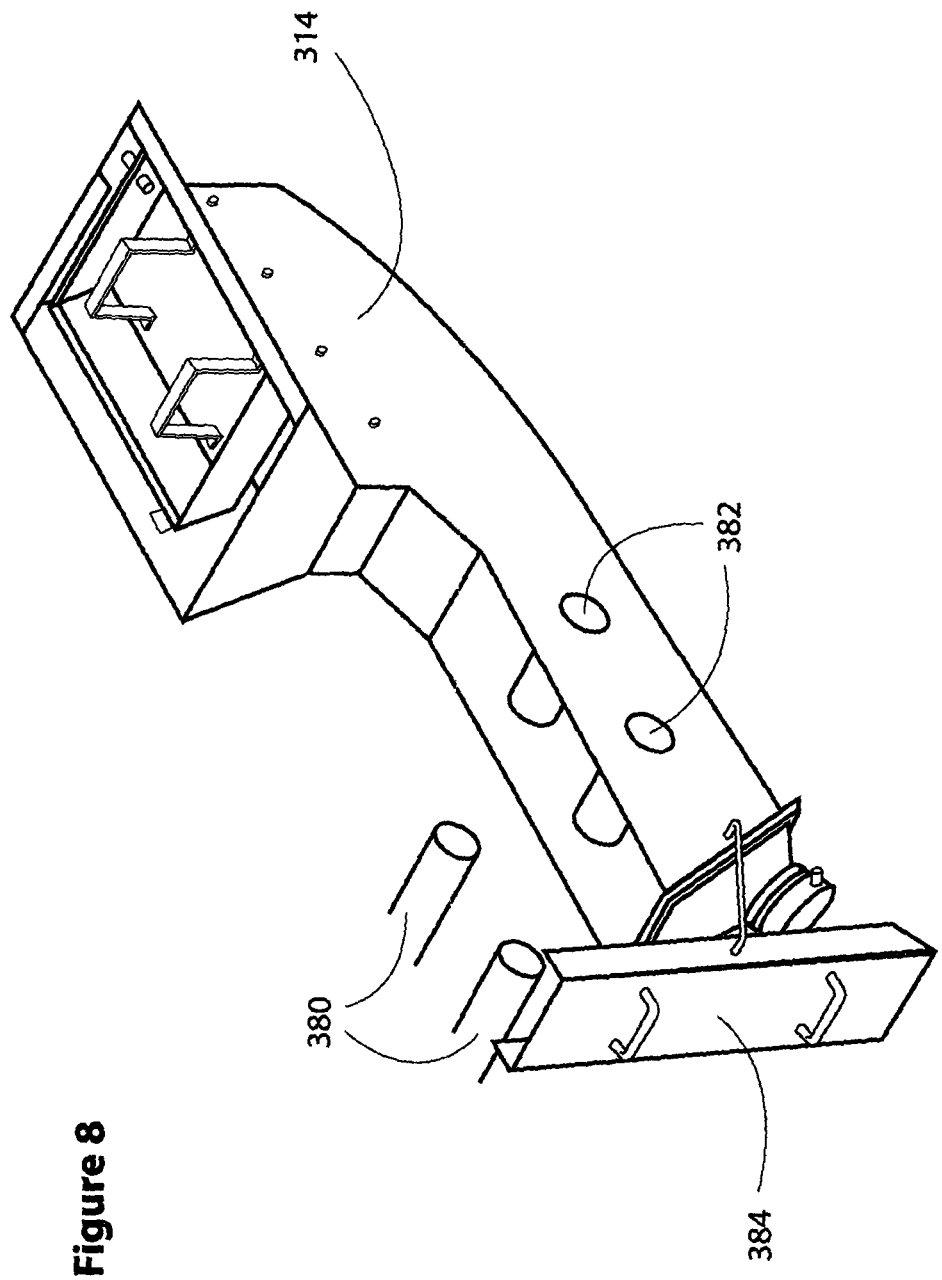
FIG. 8 is a section view of an apparatus for a lorry-based concrete mixer according to a third embodiment of the present invention.

A third embodiment of the present invention is shown in perspective view in FIG. 8. In this embodiment the vessel 314 is removable from the lorry, the lorry defining power of mounting members 380 adapted to fit in complementary apertures 382 defined by the vessel 314. Once removed from the mounting members 380, a hinged lid 384 can be removed from the vessel 314 permitting access to the vessel interior.

Various modifications and improvements may be made to the above described embodiments without departing from the scope of the present invention. For example, the vessel could be made from a resilient material adapted to permit the contents to be disturbed by hitting with a mallet for example was vessel interior could be arranged such that a disturbance medium could be provided like chains or spiked balls which prevented the debris in the vessel from settling and setting.

The invention claimed is:

1. A lorry-based concrete mixer comprising a mixing drum, a discharge chute and an apparatus mounted on the lorry, wherein the apparatus is operable to receive and retain fluid and debris exiting the discharge chute, wherein the apparatus comprises: a vessel mounted on the lorry based-concrete mixer relative to the drum and beneath an outlet end of the discharge chute; wherein the vessel has a longitudinal axis and comprises a vessel body, wherein the vessel body defines a vessel inlet and a vessel outlet, the vessel inlet being operable to receive the debris and fluid exiting the outlet end of the discharge chute, and the vessel outlet being operable to permit debris and fluid stored in the vessel body to be discharged from the vessel body; and an inlet section is attached to the vessel body, the inlet section defines a secondary inlet, wherein the secondary inlet includes a larger cross-sectional area than the vessel inlet, wherein the inlet section is configured to funnel the fluid or debris to the vessel inlet; wherein the secondary inlet, the vessel inlet and the vessel outlet, are aligned on the longitudinal axis to provide a direct line of sight for a user through the secondary inlet, the vessel inlet and to the vessel outlet such that blockages within the vessel can be more easily identified and cleared, wherein the vessel is mounted rearwards and contained on a chassis of the lorry-based concrete mixer, wherein the vessel is mounted in a position detached from and beneath the outlet end of the discharge chute such that the apparatus collects spillage from the mixing drum during travel between a loading site and a discharge site and collects washdown material following discharge of the mixing drum and contains the washdown material during travel between the discharge site and an unloading site, the unloading site being the location where the apparatus is emptied via the vessel outlet.

* * * * *